(No Model.)

I. JOHNSON.
HUB ATTACHING DEVICE.

No. 357,321. Patented Feb. 8, 1887.

Witnesses.
Lauritz W. Möller
John R. Snow

Inventor.
Iver Johnson
by his attorney,
J. E. Maynadier

UNITED STATES PATENT OFFICE.

IVER JOHNSON, OF WORCESTER, MASSACHUSETTS.

HUB-ATTACHING DEVICE.

SPECIFICATION forming part of Letters Patent No. 357,321, dated February 8, 1887.

Application filed July 14, 1884. Serial No. 137,642. (No model.)

*To all whom it may concern:*

Be it known that I, IVER JOHNSON, of the city and county of Worcester, in the State of Massachusetts, have invented a new and useful Device for Securing Wheels to Axles, of which the following is a specification.

The object of my invention is to provide a simple and efficient device for retaining a wheel on its axle which shall be always in place instead of being detachable and liable to be lost or misplaced; and my invention consists in the combination of a novel linch-pin and an axle, as hereinafter described.

Figure 1:
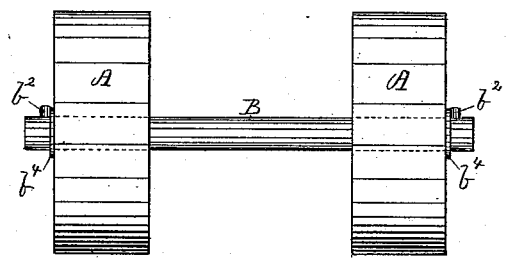
Figure 2:
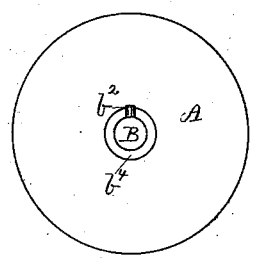
Figure 3:
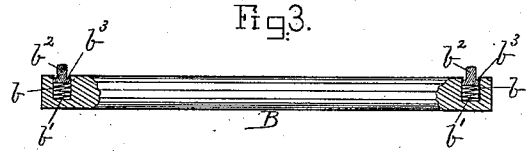
Figure 4:
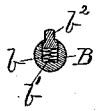

In the accompanying drawings, which illustrate my invention as embodied in the axle of a roller skate, but which is obviously applicable to other axles, Figure 1 is an elevation of an axle and a pair of wheels. Fig. 2 is an end view. Fig. 3 shows the axle partly in section to better illustrate my device, and Fig. 4 is a cross-section on line $x\,x$ of Fig. 3.

The wheels A are of any usual construction and adapted to fit the axle B. A recess, $b$, is formed in the axle, near its end. In the recess $b$ a spring, $b'$, is inserted, which serves to support and force outward a pin, $b^2$, which rests on the spring, and which fits the recess $b$ snugly, but so loosely as to move readily therein. The point or projecting end of the pin $b^2$ is best rounded, so as to enable the hub of the wheel to be more readily passed over it when the pin is depressed into the recess $b$.

The pin, when inserted and pressed into the recess against the spring $b'$, is prevented from being thrown out by the spring, when released, by means of a burr or shoulder, $b^3$, at the mouth of the recess. Such a burr or shoulder is sufficient for small axles, and is readily made after the pin is inserted by upsetting the metal near the mouth of the recess. For large axles a follower may be tapped or driven into the mouth of the recess, to form a shoulder to receive the head of the pin; or the shoulder may be otherwise formed. A washer, $b^4$, is preferably placed between the hub of the wheel and the pin.

To put on or remove a wheel, the pin is depressed into the recess until its top becomes flush with the axle, when the hub of the wheel readily passes over it, its passage being facilitated by the rounded point of the pin. A washer may then be similarly put on. As soon as the hub or the washer passes the pin its projecting end is forced out by the spring, and forms a stop which prevents the wheel from leaving the axles.

I am aware of Egerton's Patent No. 194,342, August 21, 1877, and Dibble's Patent No. 154,380, August 25, 1874, and disclaim all that is shown in them.

I claim as my invention—

The combination, with an axle having a recess made in it near its end, of a pin fitting loosely in the recess and enlarged at its inner end, a spring acting on the pin to cause its outer end to project from the recess, and the shoulder at the mouth of the recess to retain the pin, substantially as and for the purpose set forth.

IVER JOHNSON.

Witnesses:
 G. B. MAYNADIER,
 JOHN R. SNOW.